(12) United States Patent
Kang et al.

(10) Patent No.: US 12,180,367 B2
(45) Date of Patent: Dec. 31, 2024

(54) POLYPHENYLENE SULFIDE RESIN COMPOSITION AND MOLDED ARTICLES FOR AUTOMOBILES MANUFACTURED USING THE SAME

(71) Applicants: HYUNDAI MOBIS CO., LTD., Seoul (KR); HYUNDAI Advanced Materials Co., Ltd., Hwaseong-si (KR)

(72) Inventors: Hyoung Taek Kang, Yongin-si (KR); Eun Chang Lee, Yongin-si (KR); Sang Gil Lee, Suncheon-si (KR); Kwon Mo Koo, Ulsan (KR); Sang Woon Hwang, Hwaseong-si (KR); Dong Ju Kim, Suwon-si (KR)

(73) Assignees: Hyundai Mobis Co., Ltd., Seoul (KR); HYUNDAI Advanced Materials Co., Ltd., Hwaseong-si (KR)

( * ) Notice: Subject to any disclaimer, the term of this patent is extended or adjusted under 35 U.S.C. 154(b) by 31 days.

(21) Appl. No.: 18/079,284

(22) Filed: Dec. 12, 2022

(65) Prior Publication Data
US 2024/0002662 A1    Jan. 4, 2024

(30) Foreign Application Priority Data
Jun. 30, 2022 (KR) .......................... 10-2022-0080285

(51) Int. Cl.
*C08L 81/04*    (2006.01)
(52) U.S. Cl.
CPC .................................. *C08L 81/04* (2013.01)

(58) Field of Classification Search
CPC ... C08L 81/04; C08L 81/02; C08K 2201/003; C08K 2201/004; C08F 8/00
USPC .......................................................... 523/206
See application file for complete search history.

(56) References Cited

U.S. PATENT DOCUMENTS

| | | | | |
|---|---|---|---|---|
| 5,021,497 A * | 6/1991 | Ohara | ...................... | C08K 3/22 523/213 |
| 5,602,203 A * | 2/1997 | Hamanaka | ............... | C08K 5/05 525/207 |
| 6,310,130 B1 * | 10/2001 | Dubois | ..................... | C08K 3/22 524/436 |
| 2007/0021549 A1 * | 1/2007 | Kojima | .................... | C08K 7/14 524/609 |
| 2009/0253837 A1 * | 10/2009 | Takagi | ..................... | C08K 5/04 524/102 |
| 2016/0108234 A1 * | 4/2016 | Kikuchi | ................... | C08K 3/10 252/512 |
| 2020/0106328 A1 * | 4/2020 | Kim | ....................... | H02K 3/522 |

FOREIGN PATENT DOCUMENTS

KR    10-1827063 B1    3/2018
KR    10-2020-0071182 A    6/2020

* cited by examiner

*Primary Examiner* — Hannah J Pak
(74) *Attorney, Agent, or Firm* — NSIP Law

(57) ABSTRACT

Disclosed is a polyphenylene sulfide resin composition for an automobile part that includes 30 to 40 parts by weight of a glass fiber, 10 to 20 parts by weight of glass bead, and 5 to 10 parts by weight of a polyolefin resin for each 100 parts by weight of a polyphenylene sulfide resin.

16 Claims, 2 Drawing Sheets

POLYPHENYLENE SULFIDE RESIN COMPOSITION AND MOLDED ARTICLES FOR AUTOMOBILES MANUFACTURED USING THE SAME

CROSS-REFERENCE TO RELATED APPLICATION

This application claims the benefit under 35 USC § 119(a) of Korean Patent Application No. 10-2022-0080285, filed on Jun. 30, 2022, in the Korean Intellectual Property Office, the entire disclosure of which is incorporated herein by reference for all purposes.

BACKGROUND

1. Field

The present disclosure relates to a resin composition for an automobile and a molded article for an automobile manufactured using the same.

2. Description of Related Art

A terminal assembly of a conventional driving motor may have degraded electrical insulating properties after long-term heat resistance due to the nature of the plastic material, thereby decreasing the stability of functioning of the terminal assembly. In addition, a large amount of impact modifier may be added to prevent cracks due to thermal shock of overmolded parts.

In the case of terminal assembly parts, in some instances, a method of prescribing a large amount of impact modifier can be used to improve cracks due to thermal shock according to busbar overmolding inside. However, while improving thermal shock properties, this method has disadvantages in that it is difficult to secure post-shrinkage and local smoothness due to a decrease in electrical properties caused by the low heat resistance of the impact modifier and a relatively low glass transition temperature compared to the base material.

In further instances, a method of improving thermal shock properties by using a large amount of inorganic material as an impact modifier has a problem of lowering fluidity, and when the inorganic material is anisotropic, it is more difficult to secure dimensional uniformity, and the bus bar cannot withstand shrinkage and expansion due to thermal shock, leading to cracks in a thin surface.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a polyphenylene sulfide resin composition for an automobile part that includes 30 to 40 parts by weight of a glass fiber, 10 to 20 parts by weight of glass bead, and 5 to 10 parts by weight of a polyolefin resin for each 100 parts by weight of a polyphenylene sulfide resin.

The polyphenylene sulfide resin may have a melt index in a range of 20 to 30 g/min, corresponding to a measurement of the melt index in accordance with an ISO 1133 Standard at 300° C./5 Kg.

The glass fiber may have an average diameter of 10 to 11 μm and a length of 3 to 4 mm.

The glass bead may have an average diameter of 1 to 45 μm.

At least one of the glass fiber and the glass bead may be surface-treated with a silane coupling agent having at least one of an epoxy group and a glycidyl group.

The silane coupling agent may include at least one selected from a group consisting of 3-glycidoxypropyltrimethoxysilane, 3-glycidoxypropylmethyldiethoxysilane, 2-(3,4-epoxycyclohexyl)ethyltrimethoxysilane, and 3-glycidoxypropyltriethoxysilane.

The polyolefin resin may include a reactive group that binds to the surface-treated at least one of the glass fiber and the glass bead.

The reactive group of the polyolefin resin may be selected from an epoxy group or glycidyl methacrylate.

The polyolefin resin may include at least one selected from a group consisting of polypropylene, polyethylene, polybutene, polyoctene or polyisoprene, ethylene methylacrylate, glycidyl methacrylate, and an ethylene-methylacrylate-glycidyl-methacrylate-terpolymer.

The polyolefin resin may have a weight average molecular weight of 10,000 to 200,000.

The polyphenylene sulfide resin composition may further include at least one additive selected from a group consisting of antioxidants, ultraviolet (UV) stabilizers, flame retardants, colorants, plasticizers, heat stabilizers, compatibilizers, lubricants, and antistatic agents.

A molded article for an automobile may be manufactured by melt-extruding the polyphenylene sulfide resin composition.

The molded article may have a tensile strength in a range of 148 to 160 MPa and a weld strength in a range of 47 to 60 MPa, corresponding to respective measurements of the tensile strength and the weld strength in accordance with an ISO 527 Standard test method at 5 mm/min.

The molded article may have a dielectric breakdown strength in a range of 16 to 20 kV/mm, corresponding to a measurement of the dielectric breakdown strength in accordance with an IEC 60243-1 Standard test method.

The molded article may have a comparative tracking index (CTI) of grades 3 to 4, corresponding to a measurement of the CTI in accordance with an IEC 60112 Standard test method.

The molded article may have an elongation of 1.6 to 2%, corresponding to a measurement of the elongation in accordance with an ISO 527 Standard test method.

The molded article may have an Izod notched impact strength in a range of 7.5 to 10.0 KJ/m$^2$, corresponding to a measurement of the Izod notched impact strength in accordance with an ISO 180 Standard test method at 23° C.

The molded article may have a high-speed surface impact peak force of 190 to 270 N and a break energy in a range of 1.4 to 3.0 J, corresponding to respective measurements of the high-speed surface impact peak force and the break energy in accordance with an ISO 6603 test method.

The molded article may be a terminal assembly of a driving motor.

Other features and aspects will be apparent from the following detailed description, the drawings, and the claims.

Figure 1:
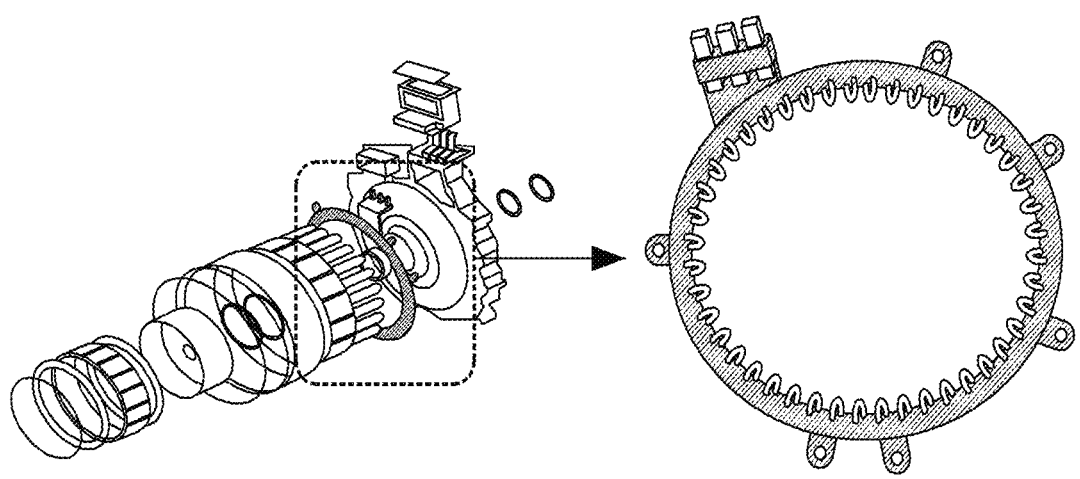
FIG. 1 is a schematic diagram showing a terminal assembly of an automobile driving motor to which a resin composition according to one embodiment of the present disclosure may be applied.
Figure 2:
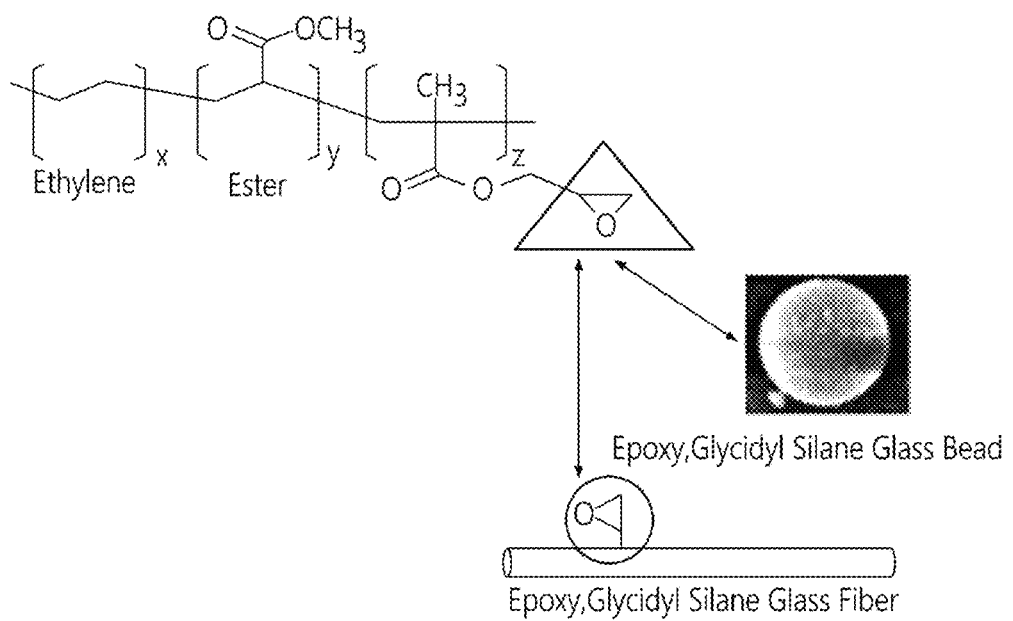
FIG. 2 is a schematic view showing a reactive group of surface-treated glass fiber and glass beads that bond to a polyolefin resin in the resin composition according to an embodiment.
Figure 3:
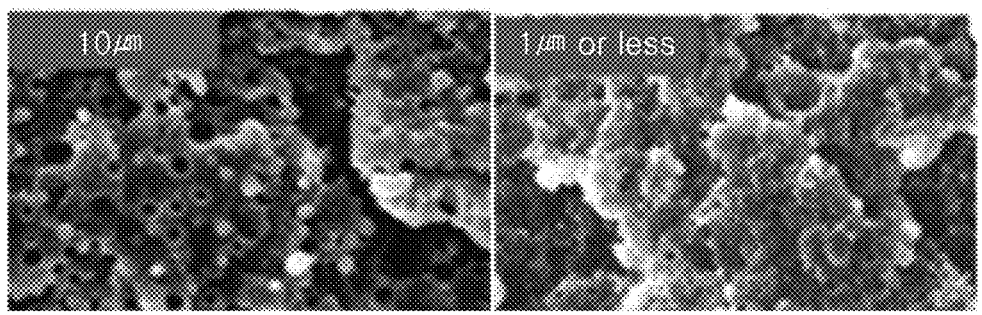
FIG. 3 is a photograph showing a particle dispersion state of a molded article to which a resin composition according to each of Examples and Comparative Examples of the present disclosure is applied.
Figure 4:
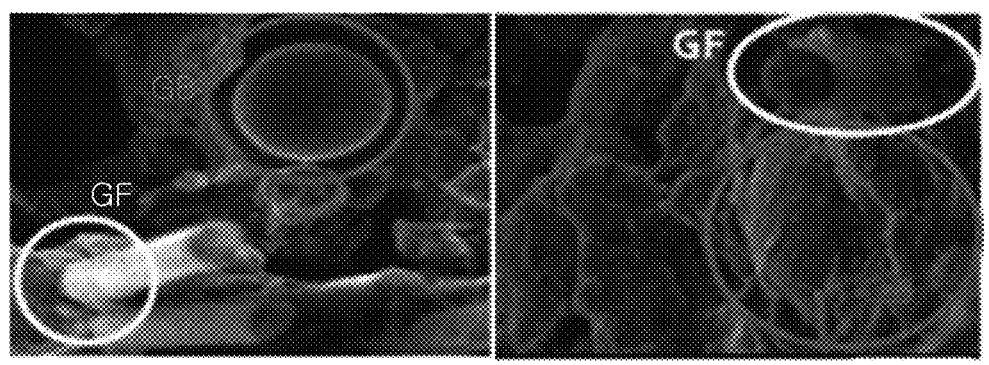
FIG. 4 is a photograph showing an adhesion state between a polymer resin, a glass fiber, and a glass bead in a resin composition according to each of Examples and Comparative Examples of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a schematic diagram showing a terminal assembly of an automobile driving motor to which a resin composition according to one embodiment of the present disclosure may be applied.

A driving motor terminal assembly has a structure connected to transmit power supplied from a high voltage connector to a coil of a stator assembly, and a motor is driven using electrical energy supplied from the coil by a terminal. FIG. 1 shows an exploded view of an automobile driving motor including a terminal assembly and a schematic diagram of the terminal assembly.

A polyphenylene sulfide resin composition for automobile parts according to one embodiment of the present disclosure includes 30 to 40 parts by weight of a glass fiber, to 20 parts by weight of glass beads, and 5 to 10 parts by weight of a polyolefin resin, based on 100 parts by weight of the polyphenylene sulfide resin.

In the resin composition, it is preferable to use a polyphenylene sulfide resin having a melt index in the range of 20 to 30 g/min, as measured at 300° C./5 Kg according to the ISO 1133 method. When the melt index of the resin is less than 20, the parts may not be molded, and when the melt index is more than 30, burrs may occur in the parts.

The glass fiber used in the resin composition may be included in an amount of 30 to 40 parts by weight, based on 100 parts by weight of the polyphenylene sulfide resin. When the content of the glass fiber is less than 30 parts by weight, rigidity of the parts may be lowered, and when the content of the glass fiber is more than 40 parts by weight, the rigidity of the parts may be increased, but the glass fiber may protrude on the surface of the parts, resulting in deterioration of the appearance surface. In addition, an average diameter of the glass fiber may be 10 to 11 μm, and a length thereof may be 3 to 4 mm. When the average diameter of the glass fiber is less than 10 μm, the rigidity may be increased, but the warpage of the parts may be increased, and when the average diameter of the glass fiber is more than 11 μm, the rigidity may be decreased, but the warpage property of the parts may be decreased. The glass beads used in the resin composition may be included in an amount of 10 to 20 parts by weight, based on 100 parts by weight of the polyphenylene sulfide resin. When the content of the glass beads is less than 10 parts by weight, the dimensional stability of the parts may be reduced, and when the content of the glass beads is more than 20 parts by weight, the dimensional stability may be increased, but the rigidity of the parts may be lowered. The glass beads may also have an average diameter in the range of 1 to 45 μm. When the average diameter of the glass beads is less than 1 μm, the processability of the resin composition may be lowered, and when the average diameter of the glass beads is more than 45 μm, the mechanical properties of the parts may be reduced.

Glass fiber or glass beads, which are surface-treated with a silane coupling agent having an epoxy group or a glycidyl group, may be used in order to improve adhesion properties with a polymer material. The silane coupling agent having an epoxy group or a glycidyl group may be, for example, one or more selected from the group consisting of 3-glycidoxypropyltrimethoxysilane, 3-glycidoxypropylmethyldiethoxysilane, 2-(3,4-epoxycyclohexyl)ethyltrimethoxysilane, and 3-glycidoxypropyltriethoxysilane, but is not particularly limited thereto.

In the resin composition according to the embodiment, a polyolefin resin may be added as an impact modifier. The polyolefin resin may be included in an amount of 5 to parts by weight, based on 100 parts by weight of the polyphenylene sulfide resin, and when the content of the polyolefin resin is less than 5 parts by weight, the ductility of the parts may be decreased, and when the content of the polyolefin resin is more than 10 parts by weight, the ductility of the parts may be increased, but the rigidity may be reduced.

Meanwhile, the polyolefin resin that can be used may be, for example, one or more selected from the group consisting of polypropylene, polyethylene, polybutene, polyoctene or polyisoprene, ethylene methylacrylate, glycidyl methacrylate, and an ethylene-methylacrylate-glycidyl-methacrylate-terpolymer, but is not particularly limited thereto, and a weight average molecular weight of the polyolefin resin may be in the range of 10,000 to 200,000.

In addition, the polyolefin resin according to the embodiment may include a reactive functional group having excellent bonding strength with an inorganic filler such as glass fiber or glass beads, and examples of the reactive functional group include an epoxy group or a glycidyl-methacrylate group, but are not particularly limited thereto. Examples of the silane coupling agent may include 3-glycidoxypropyltrimethoxysilane, 3-glycidoxypropylmethyldiethoxysilane, 2-(3,4-epoxycyclohexyl)ethyltrimethoxysilane, 3-glycidoxypropyltriethoxysilane, etc.

In addition, the resin composition may further include one or more additives selected from the group consisting of antioxidants, UV stabilizers, flame retardants, colorants, plasticizers, heat stabilizers, compatibilizers, lubricants, and antistatic agents, depending on the use of an applied product.

In addition, as an embodiment, the present disclosure provides a molded article, which is manufactured by melt-extruding the polyphenylene sulfide resin composition and applicable to a terminal assembly of an automobile driving motor.

The molded article according to the embodiment may have a tensile strength in the range of 148 to 160 MPa and a weld strength in the range of 47 to 60 MPa, as measured by the ISO 527 (5 mm/min) test method. When the weld strength of the molded article is less than 47 MPa, there is a high probability of cracks due to a thermal shock, and when the weld strength of the molded article is more than 60 MPa, there is a possibility of deterioration of dimensional stability due to high-content impact-resistance agent, and deterioration of insulation and physical properties due to heat resistance aging, which are not preferable.

The molded article may have a dielectric breakdown strength in the range of 16 to 20 kV/mm, as measured by the IEC 60243-1 test method.

The molded article may have a CTI of grades 3 to 4, as measured by the IEC 60112 test method, and an elongation of 1.6 to 2%, as measured by the ISO 527 test method.

It is suitable for the molded article to have an IZOD notched impact strength in the range of 7.5 to 10 KJ/m$^2$ measured at 23° C. by the ISO 180 test method, and a high-speed surface impact peak force of 190 to 270 N and a break energy in the range of 1.4 to 3.0 J, as measured according to the ISO 6603 test method. As a result of measurement, when the high-speed surface impact peak force is less than 190 N, cracks due to thermal shock are highly likely to occur, and when the break energy is less than 1.4 J, because the molded article is brittle, inferior properties with respect to thermal shock may be exhibited. Therefore, the molded article according to the present disclosure has the advantage of being able to simultaneously realize a high peak force and a high break energy.

In an example embodiment, a polyphenylene sulfide resin composition may be prepared. A molded article may be manufactured using the polyphenylene sulfide resin composition.

In order to prepare a polyphenylene sulfide resin composition, a polyphenylene resin was prepared as a base resin as follows, a glass fiber and glass beads were used as inorganic fillers, and a polyolefin resin having an epoxy group was used in order to enhance the ductility of the resin composition and adhesion to the filler.

Specifically, as the base resin, a polyphenylene sulfide resin having a melt index in the range of 20 to 30 g/min, as measured at 300° C./5 Kg according to the ISO 1133 method, was used. In addition, glass fiber having an average diameter of 10.5 μm and a length of 3 mm was used, and glass beads having an average diameter of 1 to 45 μm were used.

In order to improve compatibility with the polyolefin resin, glass fiber and glass beads, which were surface-treated with a silane-based coupling agent, were used. Glass fiber and glass bead surface-treated with 3-glycidoxypropyltrimethoxysilane were used. As the polyolefin resin, a polyethylene-methylacrylate-glycidyl-methacrylate-terpolymer resin having a weight average molecular weight of 10,000 to 200,000 and including an epoxy group as a reactive group was used.

Using materials prepared as above, based on (for example, corresponding to for each) 100 parts by weight of a polyphenylene sulfide resin, 35 parts by weight of a glass fiber, 15 parts by weight of glass beads, and 7 parts by weight of a polyolefin resin were uniformly mixed with a ribbon mixer to prepare a resin composition, and pellets were prepared by melt-kneading at 320° C. with a twin-screw extruder through extrusion processing. A molded article for a terminal assembly of an automobile driving motor was manufactured using the pellets thus obtained.

The physical properties of resin composition may be evaluated under test conditions as described in the example with respect to Table 1 herein below.

The results of measuring the physical properties of the resin composition prepared in the above example are shown in Table 1 below.

TABLE 1

| Test Items | Units | Test conditions | Example |
|---|---|---|---|
| Tensile strength | MPa | ISO 527 | 170 |
| Elongation | % | (5 mm/min) | 1.6 |
| Flexural strength | MPa | ISO 178 | 240 |
| Flexural modulus | | | 12,800 |
| IZOD impact (room temperature) | kJ/m$^2$ | Notched | 9.7 |
| IZOD impact (−40° C.) | | | 9.2 |
| High-speed surface impact (1T) | N | Peak force | 273 |
| | J | Total E | 2.5 |

The moldability and low warpage properties of resin composition may be evaluated under test conditions as described in the example herein below. This may include fluidity verification.

In addition, a fluidity verification of the resin composition prepared according to the above example was performed under a mold temperature of room temperature (50° C.) using a Spiral 1.5T mold, and the fluidity was evaluated as excellent as shown in Table 2 below.

TABLE 2

| Evaluation items | | Example |
|---|---|---|
| Spiral distance (mm) | Early | 213 |
| | Final (after 10 shots) | 220 |

A melt viscosity of the resin composition prepared according to the above example was measured. As a test for evaluating whether or not a burr, which is a disadvantage of a polyphenylene sulfide material, occurs, the melt viscosity was measured at 320° C. and a shear rate of 100 to about 3000, and the results are shown in Table 3 below.

TABLE 3

| Classification | | Example | Remarks |
|---|---|---|---|
| Shear rate (1/s) | 100 | 376 | Burr generation area |
| | 500 | 185 | |
| | 3000 | 92 | Injection area |

As a result of measuring the melt viscosity, it was evaluated that the possibility of occurrence of burrs in the resin composition according to the example was low.

After molding a disk or flat specimen using the resin composition, as a result of measuring the low warpage properties by fixing three axes and verifying whether one axis is lifted, the low warpage properties of the molded article according to the example of the present disclosure was evaluated to be very excellent.

The environmental reliability may be evaluated under test conditions as described in the example with respect to Table 4 herein below.

The molded article of the resin composition according to the example was evaluated for environmental reliability under the E36500-T-26 conditions, and the results are shown in Table 4 below, and as a result, it was confirmed that the resin composition according to the present disclosure has excellent insulating properties.

TABLE 4

| | | Tensile strength | Weld strength | CTI | Dielectric breakdown strength (kV/mm) |
|---|---|---|---|---|---|
| High temperature storage | 135° C., 168 hr | 152 | 47 | Grade 4 (150 V) | 16.1 |
| Low temperature storage | −40° C., 168 hr | 146 | 49 | Grade 4 (150 V) | 17.2 |
| High temperature of oil | ATF 150° C., 300 hr | 145 | 51 | Grade 3 (180 V) | 16.0 |
| Temperature and humidity cycle | Heat-resistance/Cold-resistance/Moisture-resistance 10 cycles | 146 | 44 | Grade 4 (150 V) | 15.9 |
| Thermal shock | −40° C.↔120° C., 500 cycles | 151 | 49 | Grade 3 (180 V) | 16.5 |

In addition, as a result of measuring a bad condition verification of environment reliability of the molded article using the resin composition according to the example by the ISO 6603 test method, both surface impact and insulating properties were evaluated to be excellent.

TABLE 5

| | | Surface impact (Peak Force, N) | |
|---|---|---|---|
| Items | Bad condition | Early | After bad condition |
| High temperature of oil | ATF 150° C., 1,000 hr | 270 | 230 |
| Thermal shock | −40° C.↔150° C. 500 cycles | 270 | 190 |

A molded article for an automobile manufactured using a polyphenylene sulfide resin composition according to the present disclosure has an effect of improving cracks in parts due to thermal shock and high temperature aging, can secure flattened parts by preventing local shrinkage, and can address poor insulating properties due to deterioration.

In addition, the present disclosure can provide a polyphenylene sulfide resin composition having excellent material fluidity according to a metal terminal insert and excellent dimensional consistency during assembly and fastening. In addition, it is possible to provide a material with improved weld line strength and excellent electrical properties such as CTI and dielectric breakdown strength.

Therefore, by using the polyphenylene sulfide resin composition according to the present disclosure, it is possible to provide a terminal assembly for an automobile driving motor in which insulating properties and low warpage properties are secured at the same time, thereby contributing to the development of automobiles having excellent performance.

The present disclosure provides a resin composition for an automobile that has an effect of improving cracks in parts due to thermal shock and high temperature aging, can secure flattened parts by preventing local shrinkage, and can prevent insulating properties from being degraded due to deterioration.

The present disclosure also provides a resin composition capable of reducing the occurrence of cracks in parts and improving long-term durability of a driving motor, and a molded article for an automobile manufactured using the same.

The present disclosure also provides a terminal assembly of an automobile driving motor in which low warpage properties and insulating properties are secured at the same time, thereby improving the performance of the automobile.

The present disclosure also provides a resin composition for a terminal assembly of an automobile driving motor which has improved flattening properties and suppresses deterioration in insulating properties due to deterioration of the impact modifier prescribed to prevent cracks due to thermal shock.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A polyphenylene sulfide resin composition for an automobile part, comprising:
   30 to 40 parts by weight of a glass fiber;
   10 to 20 parts by weight of glass bead;
   5 to 10 parts by weight of a polyolefin resin, for each 100 parts by weight of a polyphenylene sulfide resin; and
   at least one additive selected from a group consisting of ultraviolet (UV) stabilizers and compatibilizers,
   wherein the polyolefin resin includes at least one selected from a group consisting of polybutene, polyoctene or polyisoprene, ethylene methylacrylate, and an ethylene-methylacrylate-glycidyl-methacrylate-terpolymer, and
   wherein a weight average molecular weight of the polyolefin resin ranges from 25,000 to 200,000.

2. The polyphenylene sulfide resin composition of claim 1, wherein the polyphenylene sulfide resin has a melt index in a range of 20 to 30 g/min, corresponding to a measurement of the melt index in accordance with an ISO 1133 Standard at 300° C./5 Kg.

3. The polyphenylene sulfide resin composition of claim 1, wherein the glass fiber has an average diameter of 10 to 11 μm and a length of 3 to 4 mm.

4. The polyphenylene sulfide resin composition of claim 1, wherein the glass bead has an average diameter of 1 to 45 μm.

5. The polyphenylene sulfide resin composition of claim 1, wherein at least one of the glass fiber and the glass bead is surface-treated with a silane coupling agent having at least one of an epoxy group and a glycidyl group.

6. The polyphenylene sulfide resin composition of claim 5, wherein the silane coupling agent includes at least one selected from a group consisting of
   3-glycidoxypropyltrimethoxysilane,
   3-glycidoxypropylmethyldiethoxysilane,
   2-(3,4-epoxycyclohexyl)ethyltrimethoxysilane, and
   3-glycidoxypropyltriethoxysilane.

7. The polyphenylene sulfide resin composition of claim 5, wherein the polyolefin resin comprises a reactive group that binds to the surface-treated at least one of the glass fiber and the glass bead.

8. The polyphenylene sulfide resin composition of claim 7, wherein the reactive group of the polyolefin resin is an epoxy group or glycidyl methacrylate.

9. A molded article for an automobile, manufactured by melt-extruding the polyphenylene sulfide resin composition of claim 1.

10. The molded article of claim 9, wherein the molded article has a tensile strength in a range of 148 to 160 MPa and a weld strength in a range of 47 to 60 MPa, corresponding to respective measurements of the tensile strength and the weld strength in accordance with an ISO 527 Standard test method at 5 mm/min.

11. The molded article of claim 9, wherein the molded article has a dielectric breakdown strength in a range of 16 to 20 kV/mm, corresponding to a measurement of the dielectric breakdown strength in accordance with an IEC 60243-1 Standard test method.

12. The molded article of claim 9, wherein the molded article has a comparative tracking index (CTI) of grades 3 to 4, corresponding to a measurement of the CTI in accordance with an IEC 60112 Standard test method.

13. The molded article of claim 9, wherein the molded article has an elongation of 1.6 to 2%, corresponding to a measurement of the elongation in accordance with an ISO 527 Standard test method.

14. The molded article of claim 9, wherein the molded article has an Izod notched impact strength in a range of 7.5 to 10.0 KJ/m$^2$, corresponding to a measurement of the Izod notched impact strength in accordance with an ISO 180 Standard test method at 23° C.

15. The molded article of claim 9, wherein the molded article has a high-speed surface impact peak force of 190 to 270 N and a break energy in a range of 1.4 to 3.0 J, corresponding to respective measurements of the high-speed surface impact peak force and the break energy in accordance with an ISO 6603 test method.

16. The molded article of claim 9, wherein the molded article is a terminal assembly of a driving motor.

\* \* \* \* \*